Figure 1:
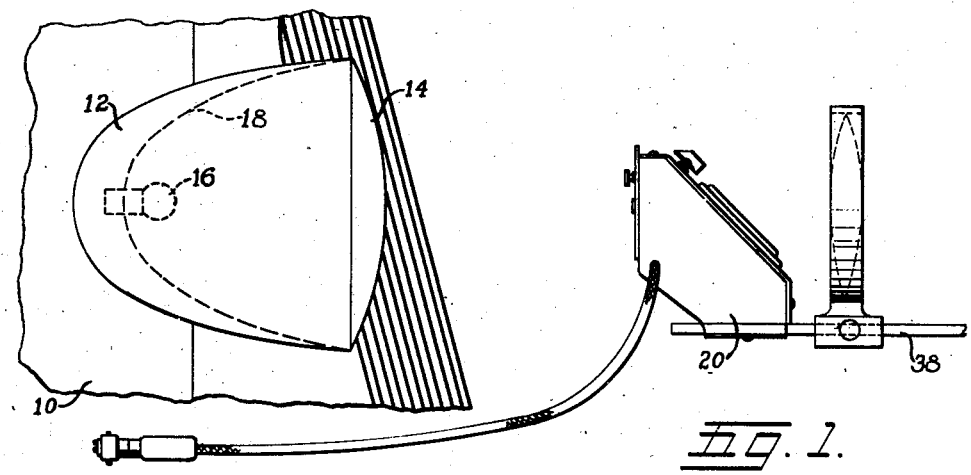

March 7, 1939.   G. M. GRAHAM   2,149,285
HEADLIGHT INTENSITY TESTER
Filed July 31, 1936   3 Sheets-Sheet 1

INVENTOR.
GEORGE M. GRAHAM
BY Parker and Burton
ATTORNEY.

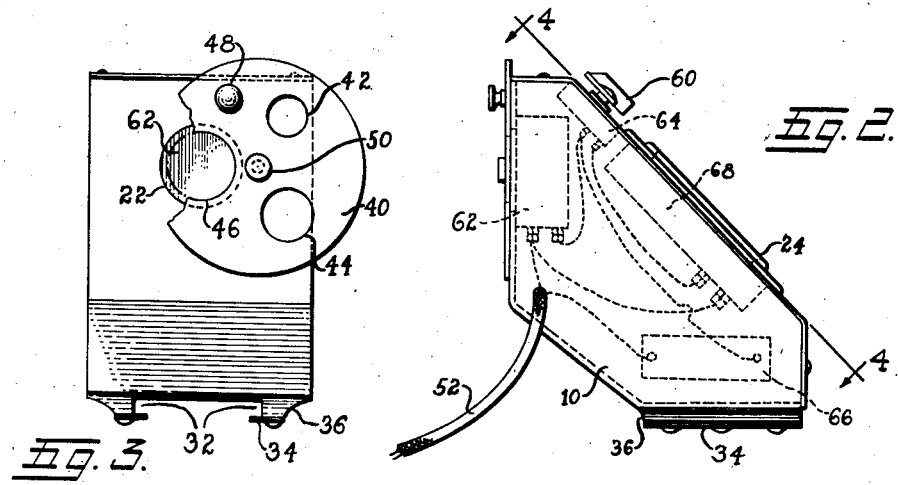
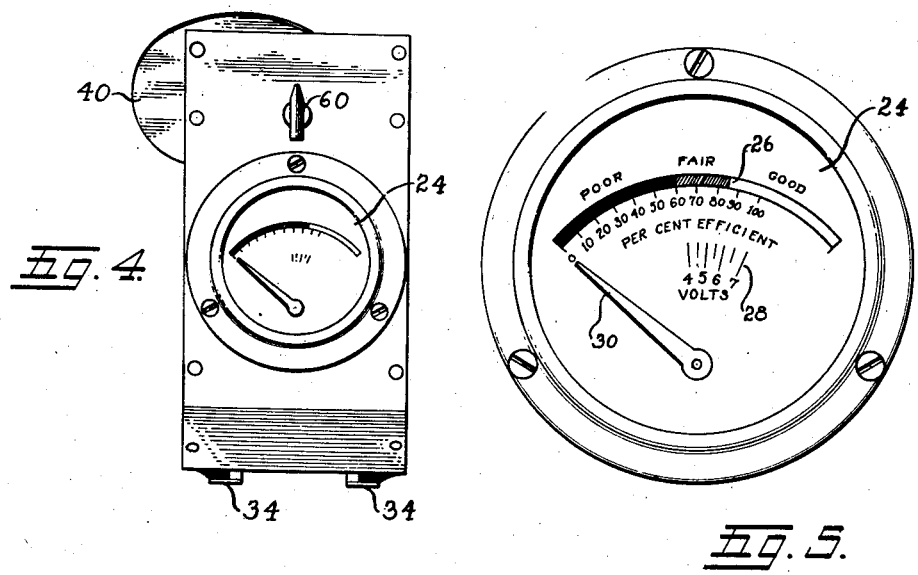
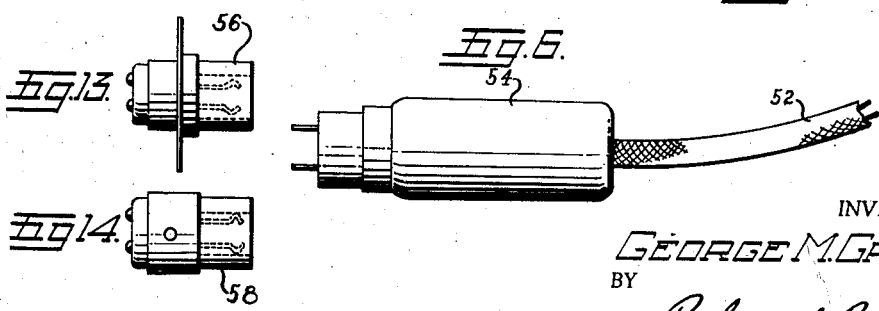

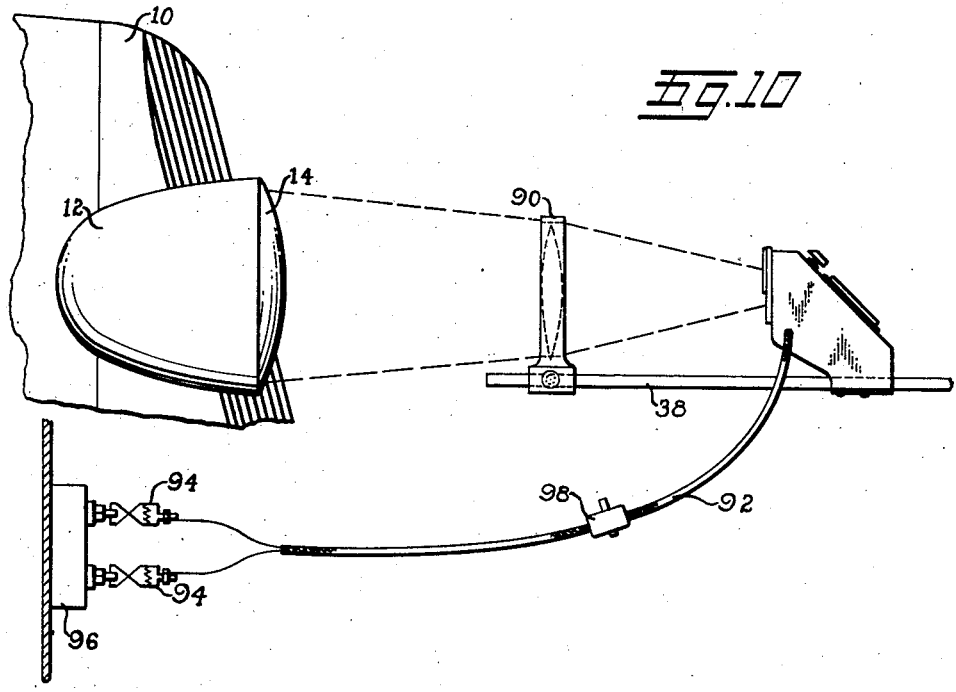
Fig. 10
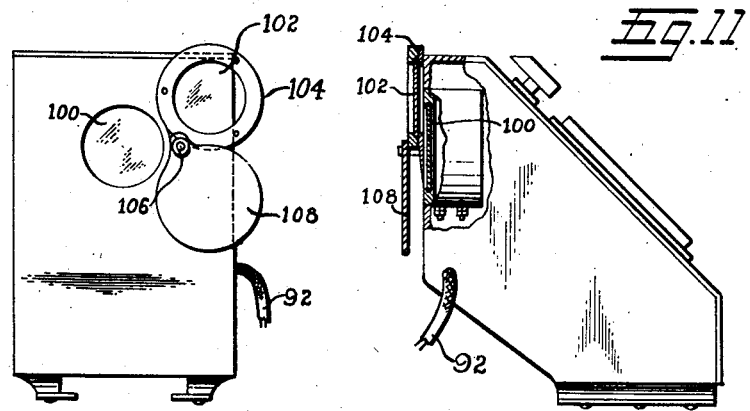
Fig. 11
Fig. 12
INVENTOR.
GEORGE M. GRAHAM
BY
Parker and Burton
ATTORNEY.

Patented Mar. 7, 1939

2,149,285

UNITED STATES PATENT OFFICE 2,149,285

HEADLIGHT INTENSITY TESTER

George M. Graham, Detroit, Mich., assignor to Hinckley-Myers Company, Jackson, Mich., a corporation of Michigan Application July 31, 1936, Serial No. 93,606

5 Claims. (Cl. 88—23)

This invention relates to an apparatus for testing the headlights of a motor vehicle.

Hithertofore it has been the practice to employ devices for measuring the efficiency of headlights which were not capable of testing different kinds or types of headlights nor adjustable for certain factors which indirectly affected headlight illumination. These devices were usually large, awkward and relatively expensive to manufacture.

Furthermore, it has been the practice to measure the intensity of headlight illumination without any consideration for the voltage of the circuit producing such illumination. It is well known that the voltage of the headlight circuit varies from time to time depending upon the conditions under which the motor vehicle is driven and that these variations alter the illumination of the headlights. When considerable driving is done in the day time, the voltage of the battery in the motor vehicle is normally increased. The reverse is true if considerable amount of driving is done at night under self-illumination. Variations in the voltage of the headlight circuit produce corresponding fluctuations in headlight illumination. The methods pursued in the past failed to take into consideration the voltage factor and accordingly the results obtained were approximate and subject at times to considerable error.

An important object of this invention is to provide a small, compact, accurate measuring device or instrument for measuring the light efficiencies of motor vehicle headlights. The device is readily adaptable to different kinds and makes of headlights. In accomplishing its purpose, the device is provided with novel means for compensating for voltage irregularities in the headlight circuit. In addition, the device is designed in an improved manner for measuring all standard candlepowers of headlight lamps. These features are all combined in a single, compact, portable instrument which is easily adjusted for all conditions encountered in headlight illumination tests of this character.

Exact results are important in headlight illumination tests. These tests are usually conducted directly in front of the headlights and small discrepancies in headlight illumination at this point make big differences in the condition of the illumination many feet in front of the vehicle. I find therefore that the procedure of ascertaining the voltage of the headlight circuit and compensating for any irregularities in the voltage is important. Tests of this character cannot be accurate if this consideration is neglected. In addition to this I provide in one of my embodiments of the invention the step of collecting substantially all the rays issuing from the headlight and measuring the light intensity of all the rays and not a portion thereof. This last step in combination with the step of compensating for voltage irregularities provides a method for measuring headlight illumination which is both accurate and novel. All factors of headlight illumination, such as the voltage of the headlight circuit and the peculiarities of headlight lenses, are considered by this method of measuring the efficiencies of headlights.

Other features of the invention are of importance. One such feature is the provision of a light sensitive circuit for measuring headlight efficiency and including a light sensitive element adapted to generate an electric current in proportion to the amount of light received thereon. The circuit is arranged in a novel manner for measuring both the candlepower of the headlight beam and the voltage of the headlight circuit. Another such feature is the provision of a dial and associated mechanism which is adapted to register the percentage efficiency of the headlight beam or the voltage of the headlight circuit depending upon the manner in which the device is associated with the headlight. Novel means is provided for compensating the circuit of the headlight tester for irregularities in the voltage of the headlight circuit so that all headlights are measured against a common standard and irrespective of what the voltages of their circuits are. In addition to these features, the device is provided with a plurality of novel elements for electrically connecting the device into the circuit of the headlight. These elements are readily adaptable to all conditions and kinds of headlights.

Figures 7, 8:
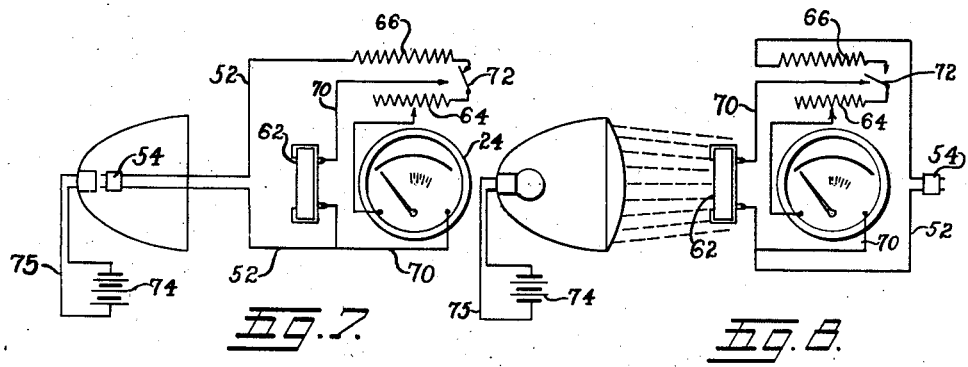
Figure 9:
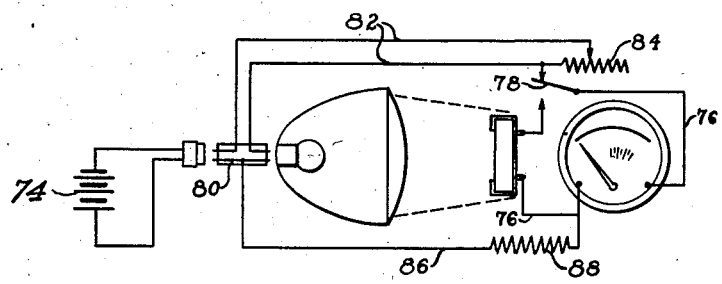

Various other objects, advantages and meritorious features will become apparent from the following specification, appended claims and accompanying drawings, wherein:

Fig. 1 is a view illustrating one position assumed in measuring the light efficiency of a headlight of a motor vehicle, Fig. 2 is a side view of the headlight testing instrument showing in dotted outline the interior construction of the instrument, Fig. 3 is a front end view of the instrument and illustrating one manner of adjusting the instrument for headlights of different standard candlepowers, Fig. 4 is a rear end view of the instrument along line 4—4 of Fig. 2, Fig. 5 is an enlarged view of the dial provided on the instrument showing a pointer and scales for indicating the percentage of efficiency and voltage, Fig. 6 is a view of the end of the electric cord attached to the instrument showing one manner of electrically connecting the instrument into the circuit of the headlight, Fig. 7 is a diagrammatic view illustrating one embodiment of the invention and one manner of connecting the circuit of the instrument into the circuit of the headlight, Fig. 8 is a view similar to Fig. 7 showing one manner of testing the light beam of a headlight, Fig. 9 is a diagrammatic view illustrating another embodiment of the invention and showing another manner of connecting the circuit of the device into the circuit of the headlight, Fig. 10 is a view illustrating another position which may be assumed for measuring the light efficiency of a headlight and showing one manner for condensing the light rays of the headlight so that all are collected and measured, Fig. 11 is a side view of a modified form of the device for testing headlight illumination, Fig. 12 is a front end view of the device in Fig. 11 showing a construction for admitting various amounts of light to the light sensitive element in the device.

Fig. 13 is a side view of one electrical contact device which may be employed with the terminal plug shown in Fig. 6, and Fig. 14 is a side view of another electrical contact which may be employed with the terminal plug shown in Fig. 6.

Referring in more detail to the drawings Figs. 1 and 10 illustrate two ways of positioning the headlight testing instrument in front of a headlight of a motor vehicle. The motor vehicle is indicated at 10. The vehicle supports in the usual way a headlight 12 having a lens 14, a lamp 16 and a reflector 18 disposed about the lamp and acting to converge the rays of light emitted by the lamp into a beam in the customary manner.

The headlight testing instrument is housed within a suitable casing or container 20 which may be shaped as illustrated in Figs. 2, 3, and 4. The front end of the casing is provided with an aperture 22 through which light is admitted to the interior of the casing. The top inclined wall of the instrument is provided with a dial 24 comprising a light efficiency scale 26, a voltage scale 28 and a pointer 30 adapted to sweep over these scales.

The bottom wall of the casing 20 is provided with a channel 32 formed by two spaced metal elements 34 each of which is secured to a projecting rib 36 so as to overhang the space between the ribs and form the channel as readily appreciated in Fig. 3. The channel formed in this manner is adapted to slidably engage about a flat elongated member or bar 38 such as that indicated in Fig. 1. This bar may be supported from the floor in any desirable way or it may form a part of a light testing apparatus such as that illustrated and described in my copending application Serial No. 82,419, filed May 29, 1936. The instrument is slidably supported on the bar 38 in front of the headlight as indicated in Figs. 1 and 10.

The amount of light entering the hole 22 may be governed by an opaque member or disc 40 having a plurality of apertures 42, 44 and 46 of varying diameters. Instead of controlling the amount of light admitted in this manner, glass filters of varying light penetrating qualities may be arranged to pass in front of the hole 22, as will be more fully described hereinafter. A knob 48 may be provided for rotating the disc about the pivotal center 50. The apertures 42, 44 and 46 are calibrated in accordance with the various candle-powers of standard lamps customarily employed in headlights. The smallest aperture 42 is intended to admit light to the instrument when the latter is used for testing headlights containing a standard lamp of the highest candlepower. The largest aperture 46 is intended to admit light to the instrument when the latter is used for testing headlights containing a standard lamp of the smallest standard candlepower. Various apertures intermediate these extreme sizes may be used when measuring headlights containing lamps of intermediate power and one such aperture 44 is shown. The candlepowers most generally used for headlight lamps are 21, 32 and 50 and the sizes of the apertures in disc 40 can be calibrated in the manner described above in accordance with these candlepowers. These apertures should be so proportioned relative to one another that each will admit the same amount of light from a correctly shining lamp of the candlepower for which they are intended. Comparative tests of headlights can then be made irrespective of the various standard candlepowers at which the lamps in the headlights may shine.

In order to electrically connect the instrument into the circuit of the headlight to ascertain the voltage thereof and make compensation therefor, there is provided a double wire electric cord 52 to the end of which is fixed a terminal plug 54. This terminal plug is arranged to detachably receive any type of electrical contact mechanism in the manner indicated in Fig. 6. The electrical contact mechanisms receivable on the end of plug 54 are constructed similarly to the lamp bases used for securing the lamps in the headlights. These bases are of various designs depending upon the headlight construction and for that reason provision is made on the plug 54 for receiving various types of contacts. Two forms of electrical contact mechanisms are shown at 56 and 58 in Figs. 13 and 14 respectively. The left hand portions of each of these mechanisms are constructed exactly like the lamp bases of two standard headlight lamps. Obviously other types of contact devices can be fitted upon the plug 54.

A variable resistance or rheostat is provided in the instrument. The handle for adjusting the rheostat extends from the top wall of the instrument adjacent the dial 24 and is indicated at 60.

The interior construction of the device is generally shown by the dotted lines in Fig. 2. It comprises a light sensitive element 62 disposed across the opening 22. The rheostat is generally indicated at 64. A fixed high electrical resistance is indicated at 66. A current meter for operating the pointer 30 is generally indicated at 68.

Two circuits for operating the parts of the instrument hereinabove described are illustrated diagrammatically in Figs. 7, 8 and 9. Similar parts are designated throughout these figures with similar reference numerals. In Figs. 7 and 8 the light sensitive element 62 generates a minute current in proportion to the light received thereon. The circuit 70 carries this current through a switch 72 and the variable resistance 64 to the curent responsive meter represented by the dial 24 and returns this current to the element to form a complete circuit.

The embodiment of the invention in Figs. 7 and 8 is adapted to employ the double wire electric cord 52 previously described. This cord is diagrammatically shown in Figs. 7 and 8 as connected into the circuit 70 on opposite sides of the element 62. The heavy resistance 66 previously described is provided in this circuit of which the cord forms a part. This resistance is adapted to cut down the relatively large current flow which would come from the headlight circuit so that the meter 68 and associated dial 24 can be used as a voltmeter. In operation, the meter has a dual function; it will function as an ammeter for measuring the light intensity and as a voltmeter when connected to the circuit of the headlight. This dual use reduces the number of parts and enables a compact and easily readable instrument to be provided.

Switch 72 can be operatively associated with the rheostat handle 60 in any suitable way so that when the rheostat is functioning as a variable resistor it will connect circuit 52 with the meter 24 but at one extreme position of its movement the handle can be arranged to cut out circuit 52 and connect the circuit 70 with the meter. Comparison of Figs. 7 and 8 shows the different positions assumed by switch 72 during the test.

In Fig. 7 the plug 54 on the end of the cord 52 is shown being attached to the lamp socket of the headlight. The circuit for the headlight including the battery 74 of the motor vehicle is shown at 75. In Fig. 8 headlight lamp 16 and the lens 14 have been replaced and the beam emitted by the headlight is received upon the element 62. The embodiment in Figs. 7 and 8 requires the removal of the headlight lens and lamp and plugging the cord 52 into the lamp circuit in order to ascertain the voltage of the headlight circuit and make compensation therefor. After the cord has been secured to the socket of the headlight lamp, the rheostat 64 is adjusted until the pointer 30 swings a certain prescribed distance, which distance of movement is intended to be used in all measurements. This distance may be indicated by the 5½ volts designation on scale 28. After the rheostat has been adjusted so that the pointer swings to this reference, the cord is disconnected from the lamp socket and the lamp and lens are replaced. The beam of light thrown by the headlight is then caught upon the element 62 and the percentage efficiency of the beam is indicated on scale 26.

In Fig. 9 there is shown a circuit diagram which does not require the removal of the headlight lamp and lens. Instead provision is made for introducing into the headlight circuit a variable resistance for varying the effective voltage of the headlight circuit at the lamp socket. The electric meter 68 is adapted to be connected either into the headlight circuit or into the circuit of the element 62 by a switch.

Referring in detail to Fig. 9 the circuit 76 between the element 62 and the meter 24 is substantially like that in Figs. 7 and 8 except for the position of a switch 78. In place of the electric cord circuit 52, there is provided a device 80 which is arranged to be introduced into the headlight circuit between the battery 74 and the headlight lamp. This device may be introduced into the headlight circuit just before the headlight as shown in Fig. 9, and certain types of headlights are constructed so that such a connection is readily made. The device is provided with a circuit 82 which carries the current of the headlight circuit to a variable resistance 84. This variable resistance can be located in the same place in the instrument and adjusted in the same manner as the previously described rheostat 64. From thence the current is returned to the headlight circuit where it is used to light the lamp. The device 80 is provided with a branch circuit 86 which runs to the circuit of the element 62 through a fixed high resistance 88. This last resistance functions in the same manner as the fixed resitance 66 previously described. The switch 78 is arranged to connect the meter 68 into either the circuit of the element 62 or the circuit of the device 80 as is readily understood from Fig. 9.

The operation of the embodiment in Fig. 9 is readily perceived. After the device 80 is introduced into the headlight circuit, the switch 78 is swung to connect the meter to the circuit 82 of this device. The high resistance 88 enables the meter to function as a voltmeter, and by varying the variable resistance 84 the resistance of the headlight circuit can be varied while the amount thereof is noted on the meter. For comparative tests the resistance 84 should be varied until the meter registers a given voltage such as 5½ volts. When this has been done the switch 78 is thrown to connect the element 62 into circuit relationship with the meter and the percentage efficiency of the headlight beam is registered on the scale 26. The headlight beam may be kept shining all the time while the switch is thrown to connect the meter with either the headlight circuit or the light sensitive element.

In Figs. 10, 11 and 12 I have shown a modification of the invention wherein all of the light beam is collected upon the light sensitive element 62 and wherein novel means is provided for detachably connecting the light testing instrument to the circuit of the motor vehicle preferably on the battery side of the headlight circuit. The instrument is constructed substantially like that described in Figs. 1 to 8, inclusive, with the exception of a few features which will be pointed out and specifically described hereinafter. The instrument is slidably supported upon the bar 38 as in Fig. 1 but a convex lens 90, which may form a part of the equipment described in my above mentioned copending application, is interposed between the headlight and the instrument. This lens is of such a size as to collect substantially all the light emitted by the headlight and condense it upon the light sensitive element provided in the instrument.

The ends of the wires in the electric cord 92 in this instance may be provided with suitable spring pressed clamps 94 for engagement with exposed terminals in the motor vehicle circuit, such as for example with the terminals usually provided in rear of the ignition switch 96 on the dash panel. An on-and-off switch 98 may be provided for opening and closing the circuit to the instrument.

Instead of providing a disc 40 with a series of apertures of varying sizes, the opening through which the light beam is directed may be covered with suitable neutral light filters of varying strengths. Such a construction is illustrated in Figs. 11 and 12. A light filter 100 is fixed in the opening of the instrument in front of the light sensitive element. The percentage efficiency scale is calibrated in connection with this filter so as to give the percentage efficiency of either the low or medium candlepowers of standard headlight lamps.

The greater majority of the motor vehicles of today use a headlight lamp of 32 candlepower.

The percentage efficiency scale can be calibrated in connection with the filter 100 to register the efficiency of such a headlight lamp, or if desired it can be calibrated to give the percentage efficiency of a standard lamp of less candlepower. In either case, an additional light filter may be provided for lamps of different candlepower. One such filter is designated at 102 mounted within a frame 104 pivoted at 106 to the outside of the casing. This filter is arranged to swing in front of the opening and superimpose the filter 102. Both filters act together to cut down the light entering the instrument and allow the instrument to be used for standard lamps of higher candlepower. Obviously any number of swingable filters may be employed for any candlepowers measured. A thin flat metal disc 108 is likewise pivotally secured to the casing and is arranged to superimpose all the filters when the latter are assembled in front of the opening and in this way protect these parts against breakage.

The apparatus described in Figs. 10 to 12, inclusive, is first assembled as shown in Fig. 10 with the lens 90 interposed between the headlight and the light testing instrument. The position of the instrument on the bar 38 should be adjusted until all the light rays condensed by the lens enter the opening in the instrument. The clamps 94 are tapped into the circuit of the motor vehicle at any accessible place but preferably before the headlight circuit. Switch 98 is turned on. If the circuit described in Figs. 7 and 8 is employed, the rheostat handle is turned so that switch 72 connects the circuit 92 with the current meter in the instrument. The voltage of the motor vehicle circuit will register on the dial and this can be adjusted to a zero reading such as to 5½ volts by turning the rheostat handle.

If a standard 32 candlepower lamp is used in the headlight, only the one light filter 100 need be used. The others may be turned away from the opening 22 of the instrument if this is the case. After compensation for the voltage of the motor vehicle battery has been made, the rheostat handle is turned to one of its extreme positions when it will disconnect the circuit 92 and connect the element 62 with the current meter 68. The percentage efficiency of the headlight beam will be indicated by the pointer 30 on scale 26. The reading will denote the efficiency of substantially the whole beam of light emitted by the headlight and irrespective of irregularities in the battery circuit.

If a poor efficiency reading is obtained, the cause may reside in the lamp bulb or the relationship between the lamp bulb and the reflector 18. The headlight circuit may be at fault and such a condition can be ascertained, if desired, by electrically connecting the light testing instrument by means of an electric cord 92 to the battery side of the headlight circuit and then to the lamp bulb side. If a variation in the readings occur when such steps are made, then a cause of the inefficient behavior of the headlight may be found in its circuit.

The scale 26 may be designed in contrasting colors as indicated to divide the scale into main regions of poor, fair and good headlight performances.

What I claim is:

1. A device for testing the headlights of a motor vehicle comprising, in combination, an electric meter having a single movable pointer and two scales one for indicating the percentage efficiency of a headlight beam and the second for indicating the usual voltages of a headlight circuit, a compound circuit for said meter including a branch circuit having a light sensitive electric element adapted to generate an electric current in proportion to the light received thereon and a second branch circuit including a high resistance and means for detachably connecting this branch circuit into the headlight circuit of an automobile, and means for selectively alternately electrically connecting the meter to either the branch circuit of said element or the branch circuit including said headlight circuit attaching means, the pointer adapted in the first mode of connection to indicate the light intensity of a headlight on the light intensity scale and in the second mode of connection to indicate the voltage of the headlight circuit on the voltage scale.

2. The invention described in claim 1 characterized by the fact that a variable electric resistance means is provided in said compound circuit to compensate for voltage irregularities in the automobile headlight circuit subjected to the test.

3. A device for testing headlights of an automobile comprising, in combination, an electric circuit including a light sensitive element adapted to generate an electric current in proportion to the intensity of light received thereon and means for detachably connecting the circuit across the headlight circuit of an automobile, an electric meter having a scale for indicating the intensity of automobile headlight beams and a scale for indicating voltages of an automobile headlight circuit, said meter also having a single movable pointer adapted to move past said scales and register either the light intensity of a headlight beam or the voltage of a headlight circuit, and switch means comprising a single movable element adapted in one position of its movement to electrically connect the meter and the light sensitive element in a closed circuit excluding the detachable connecting means and in another position of its movement to exclude the light sensitive element and electrically connect the meter and the detachable connecting means together so that when the latter is connected across an automobile headlight circuit the meter will receive current therefrom, said pointer in the first instance adapted to measure the headlight beam intensity of an automobile headlight when the beam thereof is directed upon said sensitive element and in the second instance to measure the voltage of a headlight circuit when the detachable connecting means are electrically connected across an automobile headlight circuit, and means for compensating in the readings of the headlight beam intensity scale for differences in the voltages of the circuits of the headlights tested.

4. An electric device for testing headlights of an automobile comprising, in combination, a light sensitive element adapted to generate an electric current in proportion to the intensity of light received thereon, a pair of electric leads having means on one end of each lead for electrically connecting the same in the circuit of a headlight, one of said leads having an unbroken electrical connection with said light sensitive element, the other lead including a relatively high electrical resistance, an electric meter having a scale for indicating light intensity of automobile headlight beams and a scale for indicating voltages of an automobile headlight circuit and having a single movable pointer adapted to move past said scales and register either the light intensity or the amount of voltage, said meter having a pair of electrical leads for conducting electricity thereto, one of said meter leads permanently connected with said lead which extends unbrokenly from said light sensitive element, the other meter lead connected to a switch comprising a single movable element which element is adapted in one position to electrically connect the meter lead to the side of said light sensitive element opposite that from which said unbroken lead extends and in another position to electrically connect the meter lead to the lead containing the electrical resistance, said meter adapted in the first form of switch connection to indicate by means of the pointer the light intensity of a headlight beam directed upon said light sensitive element and in the second form of switch connection to indicate by means of the pointer the voltage of a headlight circuit across which said first mentioned pair of leads may be connected.

5. A device for testing headlights of an automobile comprising, in combination, an electric circuit including a light sensitive element adapted to generate an electric current in proportion to the intensity of light received thereon and means for detachably connecting the circuit across the headlight circuit of an automobile, an electric meter having a scale for indicating the intensity of automobile headlight beams and a scale for indicating voltages of an automobile headlight circuit, said meter also having a single movable pointer adapted to move past said scales and register either the light intensity of a headlight beam or the voltage of a headlight circuit, and switch means comprising a single movable element adapted in one position of its movement to electrically connect the meter and the light sensitive element in a closed circuit excluding the detachable connecting means and in another position of its movement to exclude the light sensitive element and electrically connect the meter and the detachable connecting means together so that when the latter is connected across an automobile headlight circuit the meter will receive current therefrom, said pointer in the first instance adapted to measure the headlight beam intensity of an automobile headlight when the beam thereof is directed upon said sensitive element and in the second instance to measure the voltage of a headlight circuit when the detachable connecting means are electrically connected across an automobile headlight circuit.

GEORGE M. GRAHAM.